Feb. 7, 1933.  R. L. SCARLETT  1,896,562
SEED SOWING IMPLEMENT
Filed April 26, 1929  2 Sheets-Sheet 1
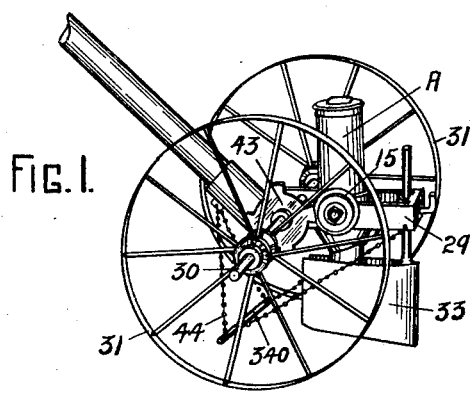
FIG. 1.
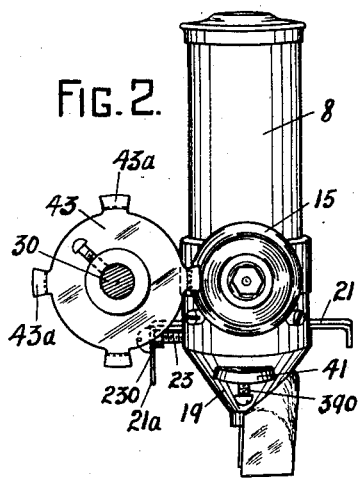
FIG. 2.
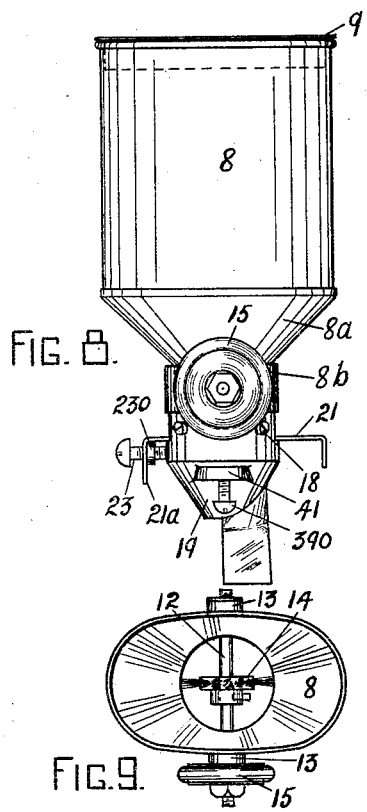
FIG. 8.
FIG. 9.
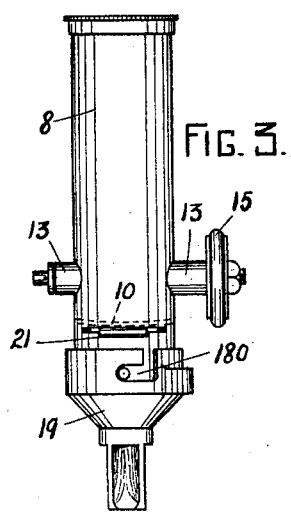
FIG. 3.
FIG. 4.
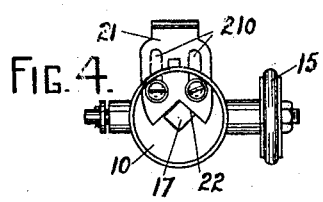
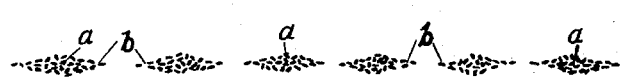
FIG. 5.
Inventor:
Robert Lindsay Scarlett
By Nathaniel Frucht
his Attorney Patented Feb. 7, 1933

1,896,562

UNITED STATES PATENT OFFICE

ROBERT LINDSAY SCARLETT, OF MUSSELBURGH, SCOTLAND

SEED-SOWING IMPLEMENT

Application filed April 26, 1929, Serial No. 358,190, and in Great Britain May 1, 1928.

This invention relates to seed-sowing implements and has reference more particularly to that class in which the seed sowing implement is mounted upon a wheeled carriage.

It is one of the objects of the present invention to provide an intermittent feed or seed delivery so that the seeds can be deposited in the drill or furrow at any desired distance apart, thereby reducing the labour of thinning-out the seedlings or young plants.

My invention also includes an improved manner of detachably mounting the implement on the carriage, an improved coulter and an improved device for covering the seeds.

The seed contained in a seed receptacle is ejected through an aperture in the receptacle by means of a rotary brush or ejector driven by means of a friction wheel which may be driven by frictional contact with the edge of a roller driven from the wheels or wheel axle of the carriage.

The present invention consists in intermittently rotating said friction wheel by intermittent frictional contact with the tread surfaces of a star wheel or step wheel which is continuously driven by or from the wheels or wheel axle of the carriage, the said star wheel or step wheel having a series of steps or treads at suitable intervals apart upon its periphery for successively engaging the tread or periphery of the friction wheel on the seed receptacle.

The star wheel is removably fitted in position, so that it can be replaced by other star wheels of different design or by a complete friction disc or roller according to the desired seed delivery.

The seed receptacle is detachably supported on the carriage by forming the frame of the carriage with notches or recesses which form slotted bearings for the reception of lateral bosses on the seed receptacle, said bosses forming bearings for the rotary brush or ejector spindle. The notches or recesses in the carriage frame thus rockably receive the bosses extending laterally from the seed receptacle, but rocking of the latter is prevented by causing a stud or projection at the lower end thereof to engage a projection or catch on the carriage frame. It will however be understood that a catch on the seed receptacle may detachably engage a projection on the frame.

The coulter is preferably made of substantial length from front to back and of narrow V-shape in plan view so that its rear portion enshrouds the seed outlet and prevents the seeds from spreading laterally.

The device for covering the seeds by turning the soil over the seeds preferably consists of a floating transverse bar hung from chains or other flexible suspension means in such a manner that the bar covers the seeds with soil and leaves the ground level.

In order that the improvements may be more readily understood, reference is hereinafter made to the accompanying drawings whereon:—

Fig. 1 is a perspective view of one construction of my improved seed-sower.

Fig. 2 is a side view of the seed receptacle shown in association with a spacing device.

Figs. 3 and 4 illustrate a modified construction of the seed receptacle, Fig. 3 showing it in back view and Fig. 4 in inverted plan with the conical bottom removed.

Fig. 5 is a diagram illustrating the manner in which seeds are sown by my improved implement.

In Fig. 6 one wheel has been removed for clearer illustration.

Fig. 8 is a side view illustrating an oval construction of seed receptacle and Fig. 9 is a plan view thereof with the lid removed from the seed receptacle.

Figure 6:
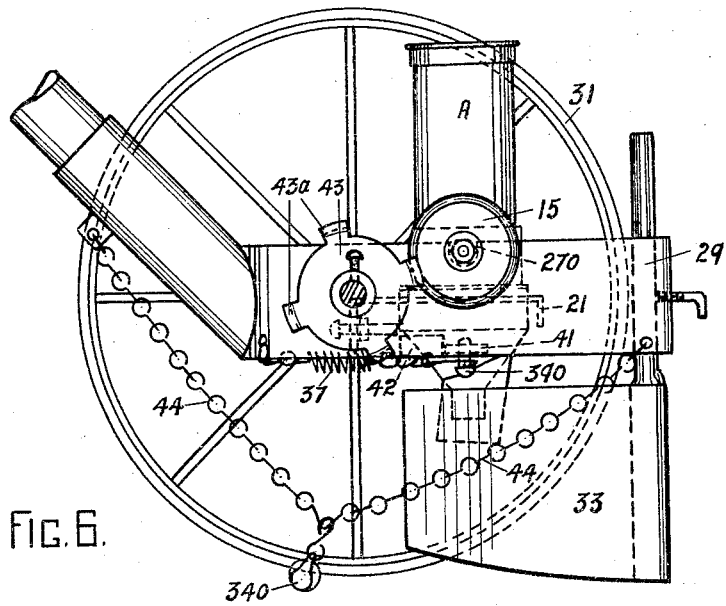
Figs. 6 and 7 are respectively a side and plan view of the implement.

The seed receptacle 8 has a conical outlet member 19 secured direct to the lower part of the seed receptacle 8. I may however attach the conical outlet member 19 by a bayonet joint 180 to a cylindrical extension of the seed receptacle 8 below the bottom 10, as in Figs. 3 and 4. In this construction the slide 21 extends through one side of the seed receptacle and is guided by studs passing through slots 210 in the slide 21 and screwed into the bottom 10. The inner end of the slide 21 is shaped at 22 to cover or wholly or partially uncover the aperture 17 in the bottom 10.

In the construction shown in Figs. 1, 2, 6, 7 and 8 the slide 21 extends through both sides of the receptacle and is adjustably fixed in any desired position by passing the screw 23 through the end 21a of the slide and into the member 19, a lock-nut 230 being fitted on the screw 23 to clamp the end 21a of the slide between the lock-nut 230 and the head of the screw 23. By slackening the lock-nut 230, the screw 23 can be screwed further into or out of the member 19 to adjust the position of the slide 21, whereupon the lock-nut 230 is again tightened up against the end 21a of the slide.

Figure 7:
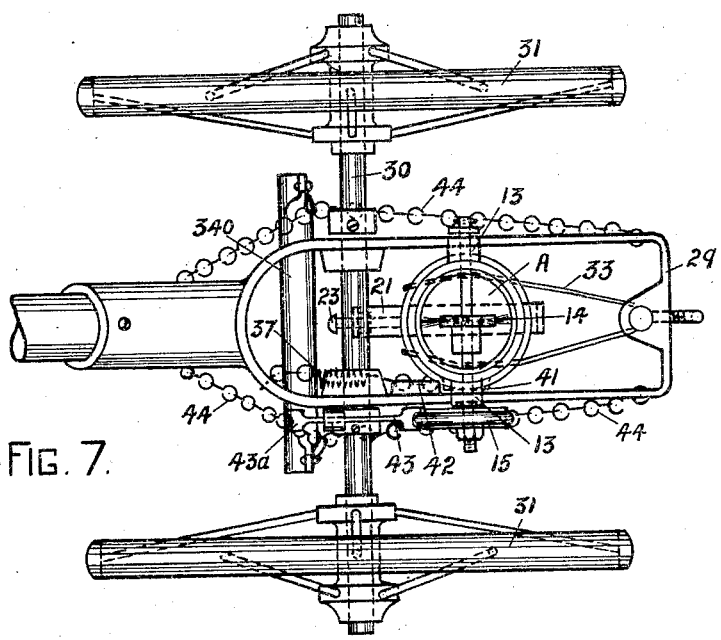

The seed receptacle designated by the general reference character A in Figs. 1, 6 and 7 is detachably supported by means of its bearings 13 in slots 270 formed in the frame 29 which is mounted on the wheel axle 30. The slots 270 in the frame 29 rockably receive the bearings 13 of the seed receptacle and rocking of the latter is prevented by the provision on the seed receptacle of a stud or projection 390 which is engaged by one end of a spring 37 attached at its other end to the frame 29. The spring 37 holds a projection or lug 41 on the seed receptacle against a projection or lug 42 on the frame 29.

In order to provide for the intermittent seed delivery, a star wheel 43 is provided, which may be conveniently carried on the axle 30. The star wheel 43 has a series of steps or treads 43a at suitable intervals apart upon its periphery for successively engaging the tread or periphery of the friction wheel 15. Any number of interchangeable star wheels 43 of different design or having treads of different length may be provided to enable the seed delivery to be varied to suit different requirements and the star wheels can be conveniently carried on the axle 30 so that they will not be readily lost.

A characteristic feature of my improvement is that the intermittent seed delivery does not result in the dumping of heaps of seeds at regular intervals, the result of which would be that the seedlings would grow up quite close together and become elongated and very difficult to thin out, but on the contrary the seeds are deposited in the manner diagrammatically depicted in Fig. 5, that is to say, the seeds are sown thicker or closer together in the centre at a and thinner at each end at b where the ultimate crop plant will grow. The thicker sowing in the centre ensures against a poor germination of seed. In this manner the seeds are separated sufficiently well to ensure better plants, the ultimate object being to provide good strong plants when the time comes for thinning out. The intermittent seed delivery provides sufficiently wide spaces between each cluster of seeds to allow the plants to develop and prevent them from becoming weakly through elongation produced by crowding. The brush or ejector 14 is sufficient to stop the flow of the seeds during the spacing and also ensures a thinner sowing of seed at each end of the cluster.

As shown in Figs. 1, 6 and 7 it is preferred to make the coulter or plough 33 of sufficient length to extend rearwards beyond the seed outlet, the space between the blades of the coulter 33 being narrowed to such an extent that the coulter is of substantially elongated V-shape when viewed in plan and enshrouds the seed outlet. This prevents the seeds from spreading laterally. The blades of the coulter 33 are preferably turned inwards slightly at their rear ends as shown in Fig. 7.

The seed-covering device comprises transverse bar 340 which floats on the surface of the soil, being suspended preferably by the chains 44 from the frame 29. The floating bar 340 serves to cover the seeds and leave the ground level. The bar 340 may be of different weight for different types and conditions of soil.

It is to be understood that the construction of carriage illustrated is given only as an example and that the carriage may be of any convenient type and that one or more seed receptacles may be mounted on each carriage for sowing in one or more rows at the same time. The carriage may also be adapted for horse or power traction.

For larger seeds or for sowing over larger areas, in order to obtain the desired deposition of the various seeds, the seed receptacle may be adjustably mounted on the carriage so as to be capable of being raised or lowered as desired, since seeds of different shapes will flow out at different speeds. A telescopic discharge tube may be provided to lead the seeds from the seed receptacle into position behind the coulter 33.

The seed receptacle shown in Figs. 8 and 9 is of somewhat larger capacity than the constructions shown in Figs. 1–7, the receptacle 8 being made oval in cross-section and fitted with a detachable oval lid 9. The oval receptacle has a frusto-conical lower end 8a which opens into a cylindrical chamber 8b having a dished bottom formed with a central aperture controlled by the slide 21. The funnel-shaped member 19 may be detachably secured, as by screws 18, to the cylindrical chamber 8b. The brush or ejector 14 is mounted within the cylindrical chamber 8b so that its bristles just protrude through the opening in the bottom thereof, the shaft 12 of the brush 14 being mounted in bearings 13 on the outside of the cylindrical chamber 8b.

I claim:

1. In a seed sowing implement, a wheeled carriage, a seed receptacle mounted on said carriage and having an aperture in the bottom thereof, an adjustable slide in said receptacle for controlling the effective size of said aperture, means rotatably mounted in said receptacle for intermittently forcing seeds therefrom through said aperture, and means actuated by movement of said carriage for intermittently rotating said seed forcing means.

2. In a seed sowing implement, a wheeled carriage, a seed receptacle mounted on said carriage and having an aperture in the bottom thereof, an adjustable slide in said receptacle for controlling the effective size of said aperture, means for setting said slide in adjusted position, means rotatably mounted in said receptacle for intermittently forcing seeds therefrom through said aperture, and means actuated by movement of said carriage for intermittently rotating said seed forcing means.

3. In a seed sowing implement, a wheeled carriage having a rotatable axle, a seed receptacle mounted on said carriage and having an aperture in the bottom thereof, a movable slide in said receptacle for controlling the effective size of said aperture, means rotatably mounted in said receptacle for intermittently forcing seeds therefrom through said aperture, and means detachably mounted on said axle for intermittently rotating said seed forcing means.

4. In a seed sowing implement, a wheeled carriage having a rotatable axle, a seed receptacle mounted on said carriage and having an aperture in the bottom thereof, a movable slide in said receptacle for controlling the effective size of said aperture, means comprising a brush element having radially disposed brushes thereon rotatably mounted in said receptacle for intermittently forcing seeds therefrom through said aperture, and means detachably mounted on said axle for intermittently rotating said seed forcing means.

5. In a seed sowing implement, a wheeled carriage having a rotatable axle, a seed receptacle mounted on said carriage and having an aperture in the bottom thereof, a movable slide in said receptacle for controlling the effective size of said aperture, a rotatable shaft mounted in and extending through one side of said receptacle, a brush element in said receptacle mounted on said shaft, a friction wheel outside said receptacle and mounted on said shaft, and a driving wheel detachably mounted on said axle and having an interrupted periphery engageable with said friction wheels.

6. In a seed-sowing device, a wheel carriage having aligned bearing receiving slots, a seed distributor having external spindle bearings removably supported in said slots, cooperating means on said distributor and carriage engageable to hold said distributor against rocking movement of its bearings in said slots, and resilient means for holding said cooperating means in engagement.

7. In a seed-sowing implement, a wheel carriage, a seed receptacle mounted on said carriage and having an aperture in the bottom thereof, means comprising a brush element having spaced brushes and rotatably mounted in said receptacle for intermittently forcing seeds from said receptacle through said aperture, and means operatively connecting said carriage wheels to said seed forcing means for intermittently rotating said seed forcing means upon movement of said carriage.

In testimony whereof I have affixed my signature.

ROBERT LINDSAY SCARLETT.